United States Patent [19]

McMullen et al.

[11] Patent Number: 4,497,775

[45] Date of Patent: Feb. 5, 1985

[54] APPARATUS FOR STORING HYDROGEN ISOTOPES

[75] Inventors: John W. McMullen; Michael G. Wheeler, both of Los Alamos, N. Mex.; Hatice S. Cullingford, Houston, Tex.; Robert H. Sherman, Los Alamos, N. Mex.

[73] Assignee: The United States of America as represented by the United States Department of Energy, Washington, D.C.

[21] Appl. No.: 406,828

[22] Filed: Aug. 10, 1982

[51] Int. Cl.³ .............................................. G21F 9/02
[52] U.S. Cl. .................................. 422/159; 252/630; 423/248; 423/644; 422/119
[58] Field of Search ................ 252/630; 423/644, 248; 422/159, 119

[56] References Cited

PUBLICATIONS

Singleton et al., "Traps for Scavenging Hydrogen Isotopes", *Proc. 3rd Topical Mtg. on Tech. of controlled Fusion,* vol. 2, May 9–11, 1978, Santa fe, New Mexico, pp. 706–713.

Bergstroem et al., "The Manufacturing Method for Copper Capsules Used for Final Disposal of Spent Nuclear Fuel" as abstracted in *Chem. Abstracts,* vol. 91 (1979) #128508t.

Noyes, "Shipping Cask for Fast Reactor Fuel Elements" LA–5526–MS, Mar. 1974.

Cullingford et al., "A Hydrogen Storage Bed Design for Tritium Systems Test Assembly", *Met.-Hydrogen Syst., Proc. Miami Int. Symp.* 1981, pp. 601–617.

Hansen et al., *Constitution of Binary Alloys,* McGraw-Hill, 2nd Ed. (1958) pp. 647–648.

Elliott, *Constitution of Binary Alloys, First Supplement* McGraw-Hill (1965) p. 877.

*Primary Examiner*—Deborah L. Kyle
*Attorney, Agent, or Firm*—William A. Eklund; Paul D. Gaetjens

[57] ABSTRACT

An improved method and apparatus for storing isotopes of hydrogen (especially tritium) are provided. The hydrogen gas(es) is (are) stored as hydrides of material (for example uranium) within boreholes in a block of copper. The mass of the block is critically important to the operation, as is the selection of copper, because no cooling pipes are used. Because no cooling pipes are used, there can be no failure due to cooling pipes. And because copper is used instead of stainless steel, a significantly higher temperature can be reached before the eutectic formation of uranium with copper occurs, (the eutectic of uranium with the iron in stainless steel forming at a significantly lower temperature).

7 Claims, 4 Drawing Figures

APPARATUS FOR STORING HYDROGEN ISOTOPES

BACKGROUND OF THE INVENTION

The present invention relates generally to methods and apparatus for storing hydrogen isotopes as hydrides and relates more particularly to methods and apparatus for storing tritium safely and for stagewise separation of hydrogen isotopes from each other. The invention is a result of a contract with the Department of Energy (Contract No. W-7405-ENG-36).

It has been known to use copper metal to plate stainless steel in order to prevent the eutectic formation of uranium and iron, which formation had been a metallurgical problem at elevated temperatures. This plating was disclosed, for example, in Los Alamos National Laboratory Report LA-5526-MS, "Shipping Cask for Fast Reactor Fuel Elements," March, 1974 on page 7 on work performed by John W. McMullen et al., as reported by Horace E. Noyes.

A desired objective has been a design suitable for storing all hydrogen isotopes including protium, deuterium, and tritium as uranium hydrides and subsequent recovery of the hydrogenous gases by dehydriding. Specifically, the storage of deuterium and tritium (DT) gas as $U(D,T)_3$ followed by the subsequent recovery of DT gas was desired. For magnetic fusion energy reactor development requirements, pumping, storing, and purifying of deuterium and tritium gases are needed, as well as the capability of scavenging low levels of tritium from inert gas streams. Another desired capability was isotopic separation of hydrogen isotopes.

Additionally, as a hydrogen economy becomes a reality with depletion of oil and gas natural stocks in the world, there will be a large need for beds for storing hydrogen in a safe manner. Beds which utilize uranium (either depleted or natural) are thought to be suitable for such a use as well.

Earlier in the 1970's, because of tritium gas storage needs for research purposes, Lawrence Livermore National Laboratory developed a certified uranium trap (referred to herein as Livermore design), which is described in detail in M. F. Singleton et al., "Traps for Scavenging Hydrogen Isotopes," Proceedings of the Third Topical Meeting on the Technology of Controlled Nuclear Fusion, Volume 2, May 9-11, 1978, Sante Fe, NM, pages 706-713 at page 710. The design described there uses a piece of stainless steel which is bored. In each of seven individual boreholes, three layers of uranium exist, spaced apart by porous frits. An inlet gas line opens into a chamber under the frit at the bottom of the trap; and gas flows upwardly through the seven columns of uranium, into another chamber above the top frit, and into the outlet line. The trap is surrounded by two alternating heating and cooling coils. The size of this particular trap is similar to a so-called "original uranium trap" which also had been developed at Livermore and which contained approximately 1800 grams of uranium in a volume of 1.5 liters.

This uranium trap, however, was found to possess certain disadvantages. First of all, its size was quite small (with a theoretical maximum storage capacity of 68.6 g of tritium). Additionally, the cooling coil which housed the gas used for cooling in the secondary cooling system possessed the following serious disadvantage: if the hydride bed were to burst, it could contaminate the gas in the cooling coil (the argon used, in this case) which could escape the system and could cause a safety hazard. Also, a larger safety margin for temperatures was desired than was possible in that design because of the iron and uranium eutectic formation. Furthermore, cryogenic temperatures needed for cooling the bed required cryogenic gas handling and bed operational dependency on cryogenic gas supplies.

Therefore, an improved design for a hydride bed was sought.

SUMMARY OF THE INVENTION

Objects of this invention are an improved apparatus and an improved method for storing isotopes of hydrogen in a safe manner within a bed of spent uranium or other hydriding material.

Other objects of this invention are an apparatus and method for storing isotopes of hydrogen such that neither cryogenic temperatures nor an active cooling system is required.

A further object of this invention is an apparatus having a large capacity for gas storage and a design that can be extrapolated to smaller or larger capacities, if desired, together with the capability for isotopic separation of hydrogenous gases at different dehydriding temperatures.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, an apparatus for storing isotopes of hydrogen (including protium, deuterium, and tritium) as hydrides of uranium without requiring any external cooling means comprises: (a) a primary containment portion comprising a copper block having a multiplicity of boreholes therein, into which powdered uranium (or other hydriding material) is to be placed, the copper block having a mass such that its total heat capacity is sufficient to handle safely all heat of hydriding given off by the powdered uranium enclosed within the boreholes when the uranium absorbs the hydrogen isotope(s) gas to form the hydride(s); (b) an external heating means for adjustably heating the copper block, wherein the external heating means is in operable communication with the copper block; (c) a sensing means in operable communication with the copper block and with the external heating means, wherein the sensing means is used for detecting whether hydriding or dehydriding is taking place; (d) a first conduit means in operable communication with the copper block, wherein the first conduit means is operably connected to first end of each of the first boreholes in the copper block; (e) a second conduit means in operable communication with the copper block, wherein the second conduit means is operably connected to a second end of each of the first boreholes in the copper block; and (f) a support means for maintaining the powdered hydriding material within the first boreholes and for allowing hydrogenous gas to pass through the first boreholes.

In a preferred embodiment of the apparatus of the invention, tritium is the isotope of hydrogen stored in vertical boreholes; and thermocouples and cartridge heaters are located in horizontal boreholes in the copper block.

Although in the prior art it was known to plate stainless steel with copper in shipping containers for radioactive fuel elements in order to avoid the metallurgical problem of the reaction of the iron in the stainless steel with uranium when the eutectic of iron and uranium forms (which occurs at 998 K.), it is known that uncoated stainless steel was used in the Livermore design described above. That design is believed to be the closest prior art. Thus, it is believed that the use of a copper block with boreholes therein of the design of the present invention is new and because of its advantage is useful and unobvious from the prior art. By using a bored solid block of copper of sufficient mass, no external cooling system is required because of the heat transfer properties of the copper.

Additionally, there is no possibility of formation of an iron-uranium eutectic. The copper supplies a more compatible system with uranium than does stainless steel because copper has a higher eutectic point with uranium (i.e., 1223 K.). Furthermore, a higher safety margin results because of this higher eutectic temperature, thus permitting higher temperatures to be reached without adverse results. Additionally, use of oxygen-free copper results in reduced hydrogen stress cracking and provides a better barrier for hydrogen isotopes permeation, as compared with stainless steel. Thus, a much safer and much more stable hydride bed is formed than was previously available in the prior art. That is, because no external cooling system is relied on, there can be no malfunction of such a system. Furthermore, the use of copper allows the size of the hydride bed (and thus the amount of hydrogen stored) to be much bigger than was previously possible because the heat transfer is much better in the design of the invention than was previously possible. Additionally, copper is not subject to hydrogen embrittlement; and this is a significant advantage.

It is believed that one possible reason why the design of the present invention has not been used previously is that copper is well known to be a relatively soft metal and therefore is not structurally sound at high temperatures. In hydrogen beds, it is important that the material making up the bed have an appropriate yield strength at operating conditions; however, in the present invention, it is required that copper be used but that it be used with end clamps which provide the strength that is required for structural support. That is, although it was recognized in the present invention that copper would lose strength when it is heated and that end plenum chambers (similar to those used in the Livermore design but which are made of copper) would buckle, it was also recognized that copper should be used in order to obtain the advantages described above and that the problems associated with the use of copper in hydride beds could be eliminated by using thick end clamps in the correct configuration made of stainless steel and by supporting the copper bed assembly in a clamping arrangement for strength.

BRIEF DESCRIPTION OF THE DRAWINGS

The accompanying drawings, which are incorporated in and form a part of the specification, illustrate embodiments of the present invention and, together with the description, serve to explain the principles of the invention.

DETAILED DESCRIPTION OF THE INVENTION

Figure 1:
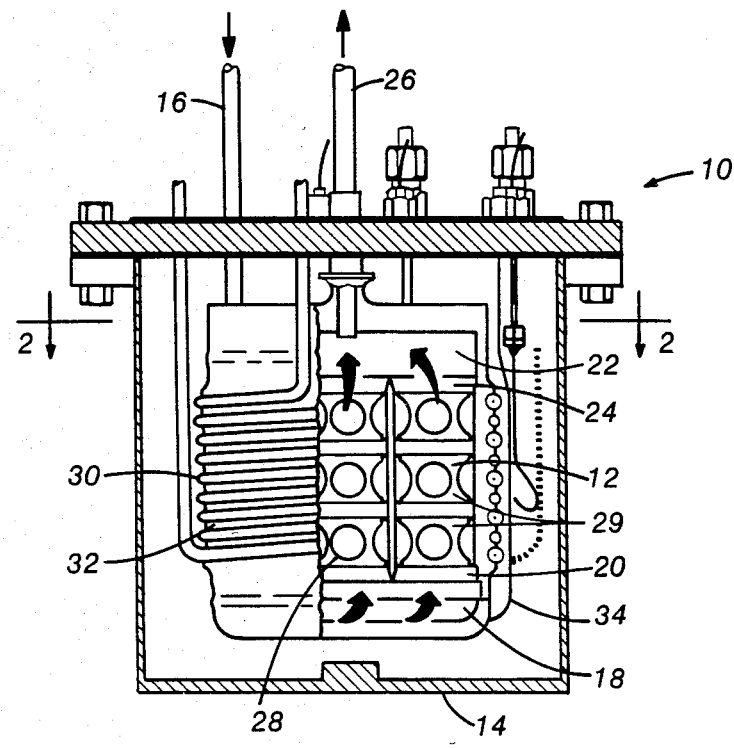
In FIG. 1 is shown in cross section the closest known prior art to the present invention. This is the "certified uranium trap" developed by Lawrence Livermore National Laboratory as described above.

Referring to the drawing, in FIG. 1 which shows the closest known prior art, the certified uranium trap developed by Lawrence Livermore National Laboratory referred to generally as 10 is shown. It comprises a primary containment system 12 (which is also called the trap) made of stainless steel, which is surrounded by a secondary containment system 14 also made of stainless steel. The inlet gas line 16 opens into a chamber 18 under the porous frit 20 at the bottom of the trap 12. The hydrogenous gas flows upwardly through the seven columns of uranium (shown in cross-section in FIG. 2) into another chamber 22 above the top porous frit 24 and to the outlet line 26. The circles 28 shown inside the trap are simply areas cut out of the spacers 29 used to separate the frit material that creates the three layers of uranium in each column.

On the outside surface of the primary containment system 12, a heating coil 30 and a cooling coil 32 alternate and surround the primary containment system 12. The heating coil is larger than the cooling coil and is a CALROD electric heater; the cooling coil is an argon gas line. The argon is at a cryogenic temperature.

Two thermocouples 34 (one of which is shown) are attached to the body of the trap 12.

The secondary container 14 of stainless steel serves as a vacuum jacket, provides thermal insulation, and contains any tritium that diffuses through the trap walls during heating.

Figure 2:
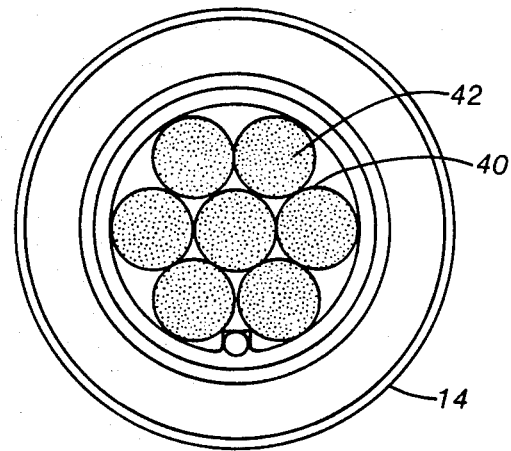
FIG. 2 is a cross-sectional view taken along the lines 2—2 in FIG. 1 showing boreholes in the block of stainless steel.

In FIG. 2, the boreholes 40 (numbering seven) of FIG. 1 are clearly shown. Within these boreholes, uranium powder 42 is located.

Figure 3:
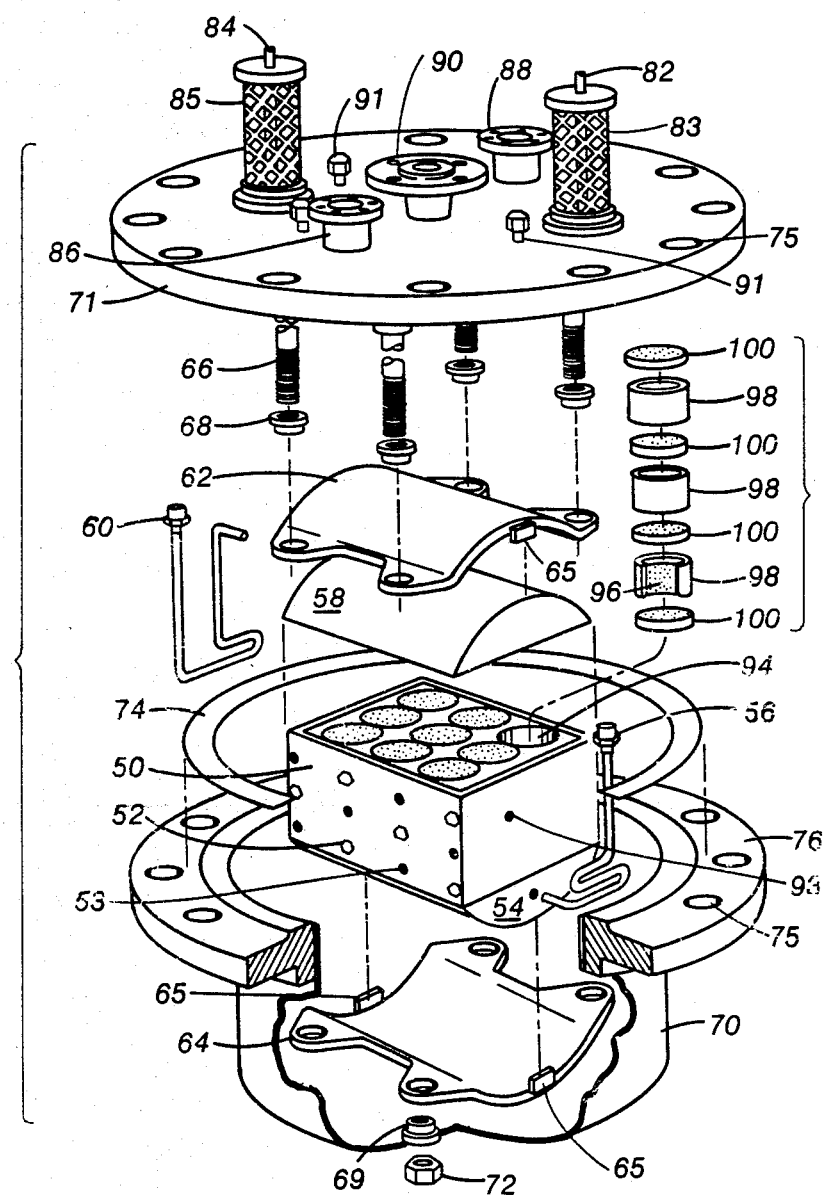
FIG. 3 is a cutaway, exploded view of the design of the apparatus of the invention developed at Los Alamos National Laboratory, showing the primary containment system made of a block of copper inside a stainless steel secondary containment vessel.

FIG. 3 is an exploded cutaway view of the apparatus of the present invention. Throughout the following, the copper which is used should be oxygen-free in order to avoid all possible oxygen reactions with other elements and in order to aid in the welding assembly. A copper block 50 forms the primary containment system of the invention. This is heated by cartridge heaters 52, which are located within boreholes 53 and which serve to drive off tritium or other hydrogen isotope(s) when it is desired that the hydrogen isotope(s) be removed from the system. Located immediately underneath the copper block 50 is an inlet plenum chamber (made of copper) 54, into which gas inlet 56 is connected. Located above the top surface of the copper block 50 is an outlet plenum chamber (made of copper) 58, to which gas outlet 60 is connected. An upper support plate 62 is positioned above outlet plenum chamber 58; and lower support plate 64 is located below inlet plenum chamber 54. Support clips 65 on plates 62 and 64 provide lateral support to copper block 50. Plates 62 and 64 are clamped together during operation by means of support rods 66 (hollow and numbering four). Ceramic bushings 68, 69 reduce the heat flow out of the copper primary chamber 50 to the cover assembly 71 and the stainless steel secondary 70. Hollow support rods 66 are welded into the cover assembly 71. Threaded nuts 72 clamp the primary assembly 50 to the cover assembly 71. A metal gasket 74 seals the secondary containment system 70 when cover assembly 71 is bolted by bolts 73 (shown in FIG. 4) through holes 75 to portion 76. Before the system is bolted together, gas connector 82 (enclosed within heat shield 83) is connected to gas inlet 56; and gas connector 84 (enclosed within heat shield 85) is connected to gas outlet 60. Heater connection 86 provides electrical connection (feedthrough) for powering the cartridge heaters 52. Vacuum port 88 provides for sampling the secondary containment to detect leaks and for evacuating that space for thermal shielding. Rupture disk 90 provides safety venting of the secondary containment in the event of an overpressure. Thermocouple supports 91 are bored-through tube connectors, and they support leads to thermocouples (not shown). Thermocouple supports 92 shown in FIG. 4 locate thermocouples which are positioned within boreholes 93 at right angles to the boreholes 94 housing the hydriding material. The thermocouples provide for monitoring of the tritium storage bed temperature. Although these thermocouples are preferred, other means for sensing whether hydriding or dehydriding is taking place could alternatively be used.

Shown in FIG. 3 in an exploded view are the contents of one of the nine boreholes 94. Chips of $^{238}$U 96 are enclosed within three copper spacers 98, which are separated from each other by porous frits made of copper 100. The frits also form a top and bottom for the storage bed to contain uranium particulate within the bed; and they act together with spacers 98 to prevent channeling of gases through the powder. The spacers are preferably made of copper but could instead be made of ceramic.

Figure 4:
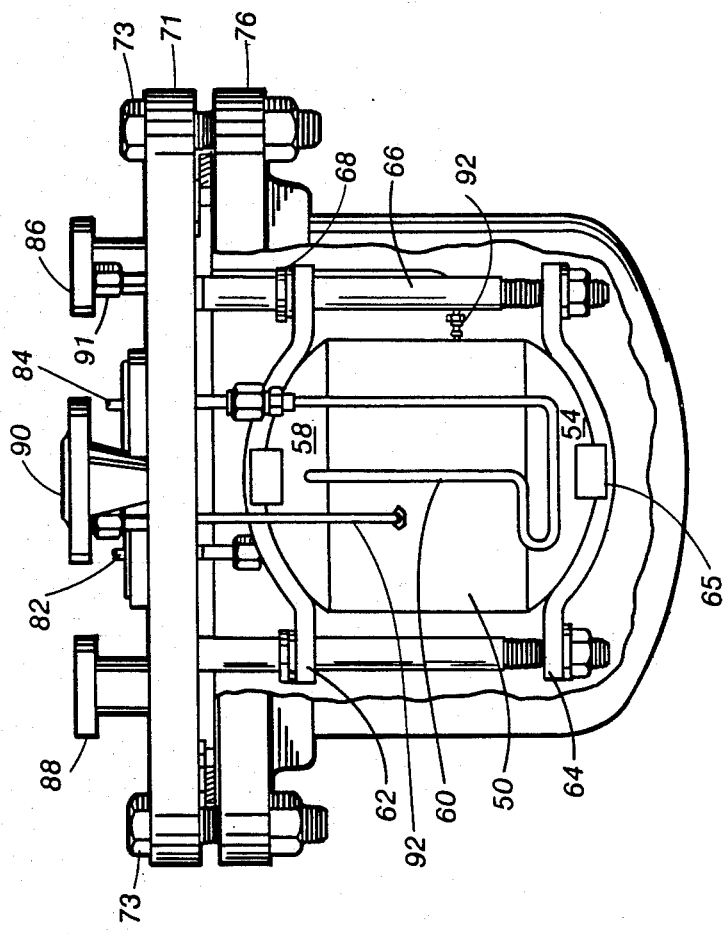
FIG. 4 is a cutaway view of the apparatus of FIG. 3 in its assembled position.

In FIG. 4, the apparatus of FIG. 3 is shown in a cutaway view as it appears when it is clamped together. Items shown in both FIGS. 3 and 4 have the same numbering.

In operation, hydrogenous gas enters the system via gas connector 82, flows into gas inlet 56, then into inlet plenum 54, from which it passes upwardly into the nine boreholes 94, which are filled with $^{238}$U chips 96, copper spacers 98, and copper frits 100. (After one hydride and dehydride operation, chips become powder.) The hydrogenous gas reacts in the boreholes so as to form a hydride, giving off the heat of hydriding (which is significant). The heat of hydriding for hydrogen is about 190 kJ/mol, as reported in the technical literature. The copper block conducts that heat of hydriding away from the hydride and into the mass of the copper. The primary containment 50 is insulated (via vacuum and ceramic spacers) from the secondary chamber 70.

Heat is conducted from the primary containment 50 via process flow lines (i.e., gas inlet 56 and gas outlet 60) and the support rods 66. Radiation cooling and heat losses by convection and conduction will dissipate adjustable levels of heat. Changing the vacuum level between the primary containment 50 and the secondary chamber 70 will change the heat transfer rate due to conduction and convection.

When it is desired to remove the hydrogenous gas from the hydride, heat is applied through cartridge heaters 52 via heater connector 86. By sequentially dehydriding at appropriate temperatures, the three isotopes of hydrogen can be separated from each other. And by using several of the apparatuses of the invention in series, various levels of enrichment can be obtained.

EXAMPLE

Apparatus as shown in FIGS. 3 and 4 and as described above has been constructed. Six identical beds were constructed, and each apparatus housed 5.94 kg of $^{238}$U. This amount will react with 29.95 g of $H_2$ when the bed is operated at 40% of its total capacity (40% being the level for which the bed was designed for kinetic reasons and which is also appropriate for safety). This corresponds to a capacity at the 40% utilization level of 74.87 g of DT. Thus, the total capacity for $H_2$ would be 74.87 g; and for DT, 187.2 g.

The apparatus has not yet been tested, although a check of the insulation between the primary containment 50 and the secondary chamber 70 has been run. Based upon the past experience of the inventors, it is expected that the apparatus will operate satisfactorily and will be suitable for storing isotopes of hydrogen.

The foregoing description of the preferred embodiments of the invention has been presented for purposes of illustration and description. It is not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular uses contemplated. It is intended that the scope of the invention be defined by the claims appended hereto.

We claim:

1. Apparatus for storing hydrogen isotopes as hydrides without requiring any external cooling means, said apparatus comprising:
   (a) a copper block having a multiplicity of first boreholes extending therethrough, into which hydriding material is to be placed, said copper block having a mass sufficiently large to safely absorb the heat of hydriding given off upon complete hydriding of said hydriding material, a pair of copper plenum chambers covering the openings of said first boreholes at opposite ends of said block, a pair of thick stainless steel end clamps cooperably shaped to conform to and reinforcably back said copper plenum chambers, and means for clamping said end clamps together so as to compress and contain said plenum chambers and said copper block therebetween, whereby the copper block and copper plenum chambers are provided with sufficient yield strength to safely contain pressurized gas at elevated operating temperatures;
   (b) an external heating means for adjustably heating said copper block, wherein said external heating means is in operable communication with said copper block;
   (c) a sensing means in operable communication with said copper block and with said external heating means, wherein said sensing means is used for detecting whether hydriding or dehydriding is taking place;

(d) a first conduit means in operable communication with a first one of said plenum chambers, wherein said first conduit means is operably connected to a first end of each of said first boreholes in said copper block;

(e) a second conduit means in operable communication with a second one of said plenum chambers, wherein said second conduit means is operably connected to a second end of each of said first boreholes in said copper block; and (f) a support means for maintaining said hydriding material within said first boreholes and for allowing hydrogenous gases to pass through said first boreholes.

2. Apparatus according to claim 1, wherein said sensing means comprises thermocouples.

3. Apparatus according to claim 2, wherein said support means comprises copper frits and wherein said apparatus includes also a series of copper spacers which are located within said first boreholes and which are used together with a series of said copper frits to distribute efficiently hydrogenous gas through said hydriding material.

4. Apparatus according to claim 1, wherein said heating means comprises a multiplicity of cartridge heaters positioned within second boreholes in said copper block, wherein said sensing means comprises a multiplicity of thermocouples positioned within third boreholes, and wherein said second boreholes and said third boreholes are located substantially parallel to each other and perpendicular to said first boreholes.

5. Apparatus according to claim 4, and including also hydriding material contained within said first boreholes.

6. Apparatus according to claim 5, wherein said hydriding material is uranium.

7. The apparatus defined in claim 1 wherein said copper block is rectangular and wherein said copper plenum chambers are substantially hemispherical, and wherein said stainless steel end clamps are also substantially hemispherical and cooperably conform to said plenum chambers.

* * * * *